United States Patent [19]

Chance

[11] 4,199,030
[45] Apr. 22, 1980

[54] METHOD AND APPARATUS FOR FARMING ROW CROPS

[75] Inventor: John H. Chance, Bedford, Tex.

[73] Assignee: Martin Concrete Engineering Company, Fort Worth, Tex.

[21] Appl. No.: 816,542

[22] Filed: Jul. 18, 1977

[51] Int. Cl.² ............... A01B 33/02; A01B 49/06; A01B 33/12
[52] U.S. Cl. ............................. 172/1; 111/1; 172/72; 172/119; 172/122
[58] Field of Search ............... 172/1, 48, 51, 60, 63, 172/67, 71, 72, 112, 118, 119, 122, 123, 540, 548, 549, 550, 554, 52; 111/1, 52

[56] References Cited

U.S. PATENT DOCUMENTS

| | | | |
|---|---|---|---|
| 106,441 | 8/1870 | Wilson | 172/75 |
| 534,403 | 2/1895 | Mechwart | 172/121 X |
| 1,331,200 | 2/1920 | Hoefen | 172/550 |
| 1,396,037 | 11/1921 | Garst | 172/1 |
| 2,228,389 | 1/1941 | Garey | 172/548 |
| 2,753,782 | 7/1956 | Chattin | 172/1 X |
| 3,202,221 | 8/1965 | Monk et al. | 172/60 X |
| 3,372,657 | 3/1968 | Hansen | 111/1 |
| 3,831,536 | 8/1974 | Orthman | 111/1 |
| 3,892,278 | 7/1975 | Smith et al. | 172/119 X |
| 3,995,570 | 12/1976 | Lely | 172/72 X |

FOREIGN PATENT DOCUMENTS

| | | | |
|---|---|---|---|
| 287081 | 6/1914 | Fed. Rep. of Germany | 172/72 |
| 2145899 | 3/1972 | Fed. Rep. of Germany | 172/123 |
| 984351 | 2/1965 | United Kingdom | 172/119 |

*Primary Examiner*—Paul E. Shapiro
*Attorney, Agent, or Firm*—Hubbard, Thurman, Turner, Tucker & Glaser

[57] ABSTRACT

A soil working implement for use in forming a raised soil bed is disclosed. The implement includes a carriage assembly and a plowing tool mounted for rotation on the carriage assembly. The plowing tool includes a cylindrical rim and an array of soil digging teeth rigidly secured to the rim and projecting radially with respect thereto for moving soil laterally relative to the line of travel of the implement. Each tooth is characterized by an inclined face slanting away from the direction of rotation of the rim and converging to form a cutting edge which is canted at an oblique angle with respect to the line of travel. A plurality of the plowing tools are mounted along a rotatable shaft which extends transversely with respect to the line of travel of the carriage assembly, and the cutting edges of the teeth in adjacent pairs of the plowing tools are oppositely canted with respect to each other for lifting and laterally displacing soil toward or away from the common center line of travel of the adjacent pair of tools. A method of tilling soil for farming a row crop in a field which can be carried out by the apparatus of the invention is also disclosed.

63 Claims, 24 Drawing Figures

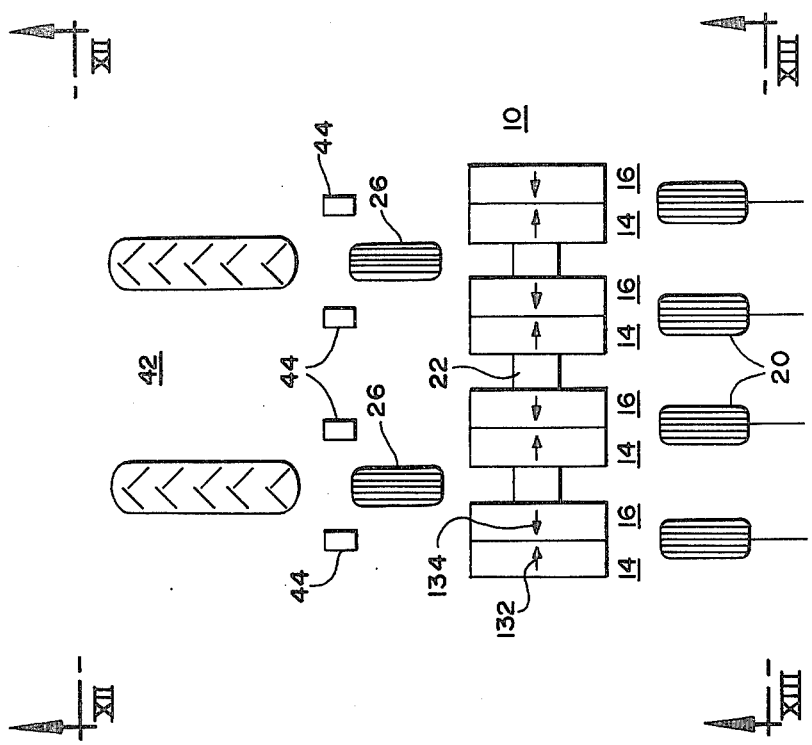
FIG. 11
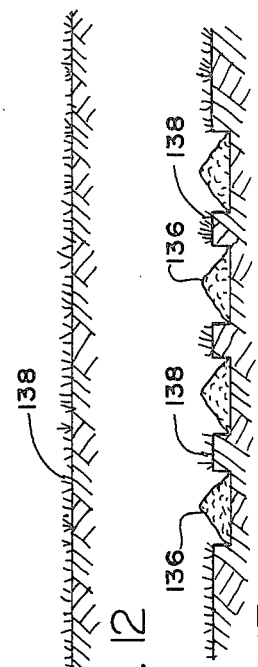
FIG. 12
FIG. 13
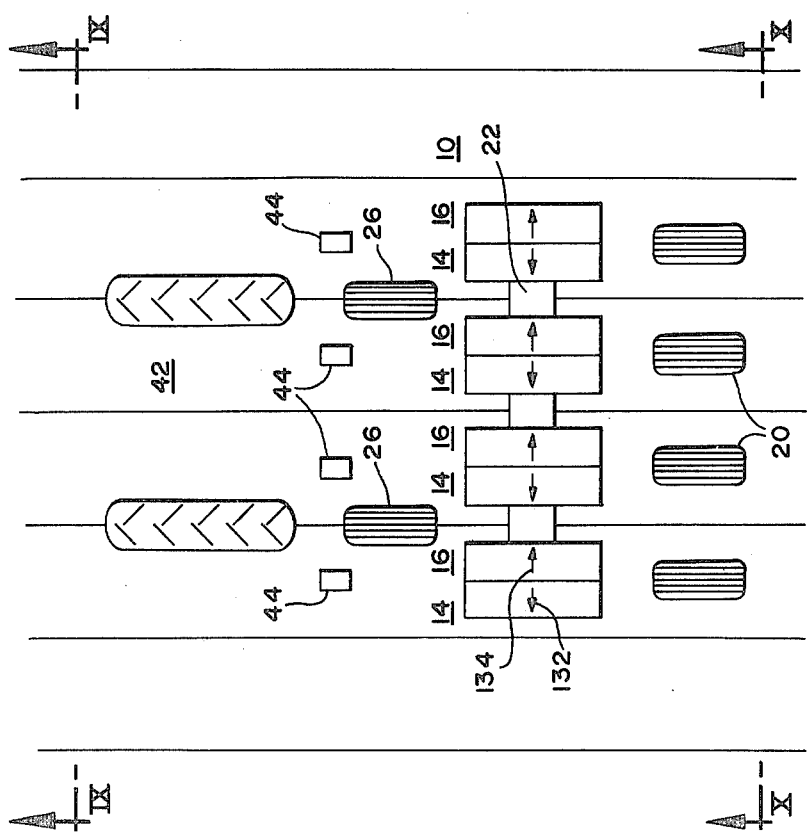
FIG. 8
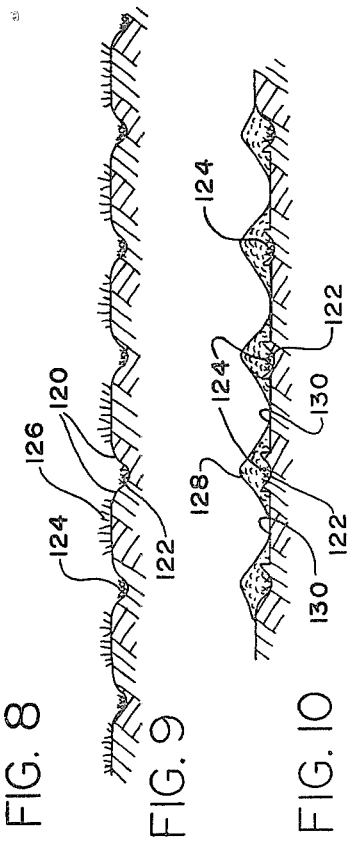
FIG. 9
FIG. 10

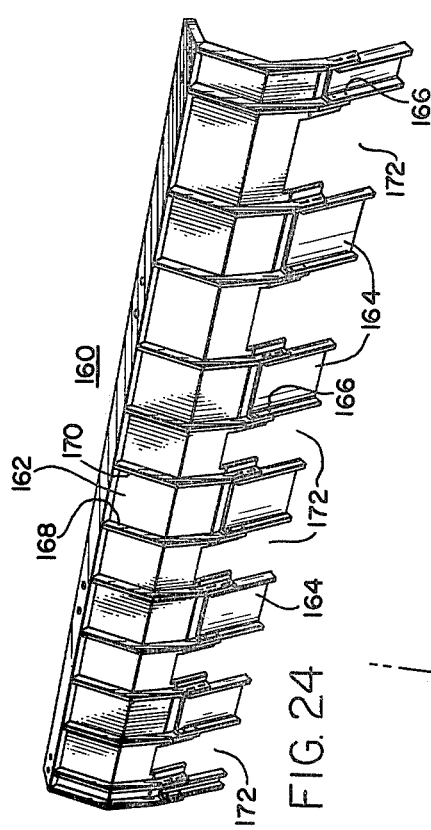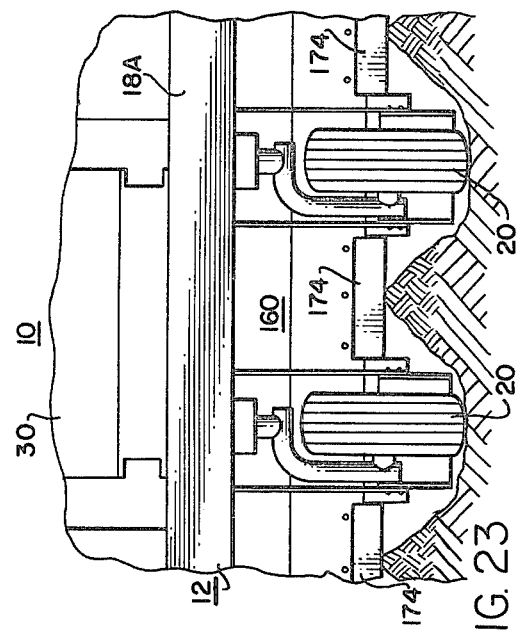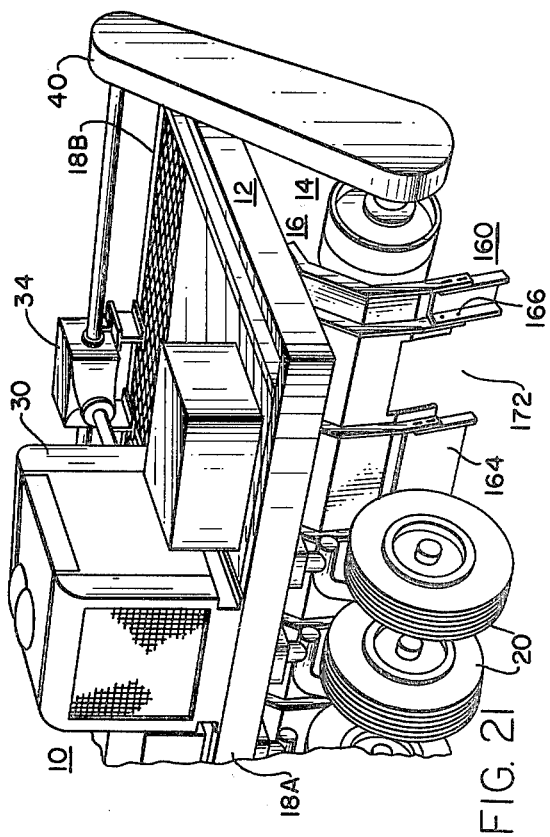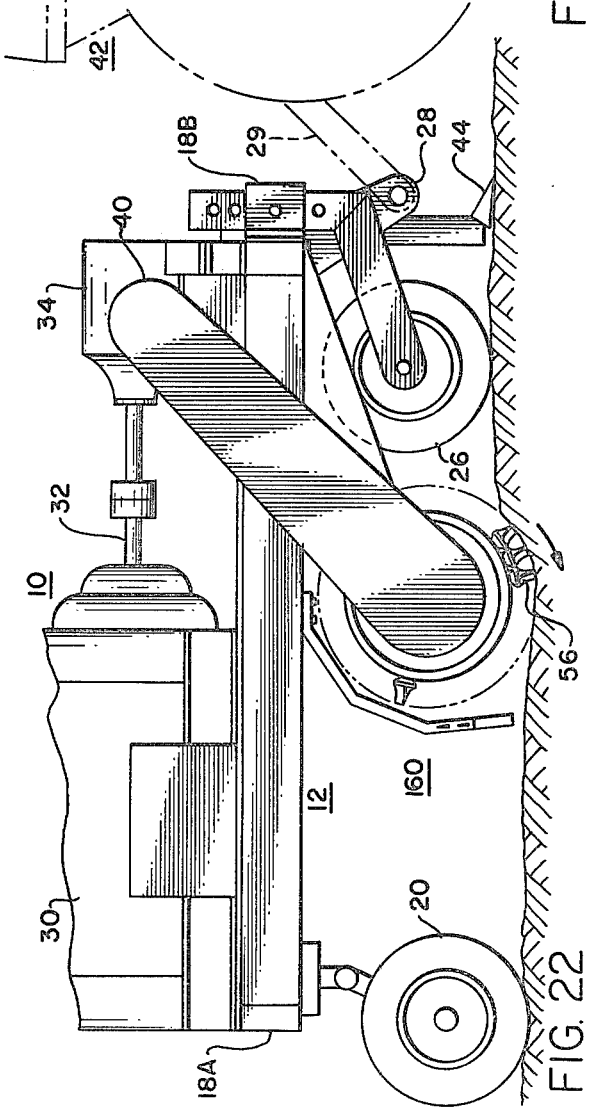

METHOD AND APPARATUS FOR FARMING ROW CROPS

BACKGROUND OF THE INVENTION

1. Field of the Invention

The present invention relates to an agricultural implement for tilling soil and to a method for row crop farming, and more particularly to a rotary plow or moldboard for producing an elevated row of comminuted soil.

2. Description of the Prior Art

An important requirement in agriculture is the formation in soil of seedbed rows and furrows or hardpan middles in combination with the seedbed rows. In dry land farming, where the natural rainfall is adequate to produce a crop, the crops are farmed in elevated seedbed rows with furrows formed intermediate the rows. In this method of farming, farmers are continually faced with the problem of receiving sufficient rainfall at the right time to derive a profitable yield from their crop. Conservation of the moisture as it is received is of utmost importance. Of equal importance to the dry land farmer is the use of the watershed from surrounding unused land to supply extra moisture to the cultivated field. The soil of the seedbed rows is preferably finely comminuted so that it will absorb large volumes of watershed moisture and retain the moisture during periods of insufficient rainfall for the benefit of the growing crop.

In farming irrigated row crops, it is common practice to form elevated seedbeds which are bounded on laterally opposite sides by parallel irrigation furrows or hardpan middles from which water seeps into the beds. According to conventional practice, the elevated seedbeds must be shaped, prepared for seeding, seeded and cultivated using several different and specialized machines. For example, a bed shaping implement is utilized for forming the furrows in intermediate raised seedbeds, another implement is utilized for leveling the bed surface and tilling the bed in preparation for planting, and still another implement is utilized for planting seeds. This procedure is relatively costly and time consuming.

Various soil working implements have been constructed for producing the elevated seedbeds in furrows necessary for row crop farming. One commonly used tilling implement which is driven by a towing vehicle includes a cylindrical drum or rim mounted for rotation on a shaft which extends laterally with respect to the line of travel of the tilling implement. Soil digging teeth are secured to the drum and are arranged to slice the soil into compact molds from the ground surface and deposit the molds to the rear of the implement in an inverted condition. In such an arrangement, the cutting surfaces of the teeth compact the soil thereby transmitting a shock to the rim and causing the rim to drift away from its line of travel. The shock generated by the compacting action is also transmitted to the power mechanism which rotates the rim possibly causing damage thereto. A related problem to this type of tooth arrangement is the clogging of soil around the rim and along the face of the tooth which interferes with the cutting action. The clogging effect is particularly severe when the soil is wet. Also, when the moisture content of the soil is relatively low, it is difficult for the teeth to cut through as they are compacting the dry soil. Thus the plowing season for conventional rotary plows is greatly restricted to times when the soil is neither too wet nor too dry. Furthermore, the compacting action of the teeth increases the horsepower requirements of the implement.

It is desirable in the tillage of soil for certain row crops that the soil be comminuted or broken up into very small portions so that the soil in the seedbed is relatively light and fluffy and aerated as compared to the unplowed soil. Such soil consistency is important for promoting proper root growth and for sustaining the capillary flow of moisture through the soil to the roots. Conventional tilling apparatus is available for comminuting soil; however, multiple passes with different agricultural implements must be made to form elevated seedbeds of comminuted soil and the adjacent furrows. The conventional implements which are available are typically characterized by lateral drift problems, clogging of the teeth, and uneven resistance to forward rolling movement of the implement as the teeth engage the soil, thereby producing destructive vibration and pulsations which are transmitted to the implement and to the towing vehicle.

In view of the difficulties and disadvantages inherent in conventional soil working implements, it is a particular object of the invention to provide method and apparatus which will comminute, mulch and aerate the soil in elevated seedbeds by means of a self-cleaning rotary plow with relatively less expenditure of horsepower, and which offers minimum resistance to the forward rolling movement of the implement as it engages the soil, thereby avoiding side drift and mechanical pulsation problems.

SUMMARY OF THE INVENTION

To overcome the difficulties and disadvantages inherent in the prior art as discussed above, the present invention provides a rotary plow or moldboard which comprises generally a cylindrical rim having an array of radially projecting teeth secured to the periphery of the rim. Each tooth of the array is characterized by first and second planar faces, at least one of the faces being obliquely inclined with respect to the radial axis of the tooth and sloping away from the direction of rotation of the rim so that it is self-cleaning. The planar faces converge at the distal end of the tooth to define a cutting edge which is oriented with respect to the surface of the rim in such a manner that the plane containing the cutting edge and the radial axis of the tooth defines an oblique cutting angle with respect to the plane containing the radial axis of the tooth and the line of travel of the rim. Because the teeth are canted, the soil engaged by the teeth is elevated and moved laterally with respect to the line of travel of the tooth thereby eliminating compaction of the soil and thereby reducing the amount of horsepower required to operate the implement.

A further advantage to the oblique canting arrangement of the teeth is that entry into the soil occurs on the points of the teeth rather than along the entire cutting edge of the teeth as occurs in the prior art compacting arrangement. This arrangement provides increased tip loading, that is the ratio of the weight of the machine to the surface area of the tooth penetrating the soil, which improves its ability to break rocks or penetrate hardpan without damaging the teeth. The teeth are arranged in groups of arrays and the cutting edges of the teeth of adjacent arrays are oppositely canted with respect to each other for lifting and laterally displacing soil toward or away from the common center line of travel of the adjacent arrays which operates to cancel out pulsations or vibrations which occur when the teeth enter the soil. This also eliminates side drift since the loading on the teeth is balanced.

In a preferred embodiment, the teeth of each array are disposed in a plurality of spiral rows around the periphery of the rim with the rows being equally spaced in parallel with respect to one another and the teeth within each row being equally spaced one from another. The number of teeth in each of the spiral rows are the same and corresponding teeth of adjacent rows are located at the same axial distances measured from the edge of the rim so that one tooth from each spiral row cuts along a common path which corresponds to an axial increment of rim surface. This structural arrangement ensures that each increment of soil is thoroughly comminuted and aerated as the implement moves across the soil.

According to another important feature of the invention, the rims are adjustably secured to a shaft by means of a plurality of tapered keys which in cooperation with fastening means and axially extending slots permits the axial position of the rim to be adjusted without removing the shaft from its supporting frame.

According to another important aspect of the present invention, the rotary moldboard of the present invention may be used in carrying out a method of tilling soil for farming a row crop in a field which includes the steps of comminuting the soil to a predetermined depth below the unplowed surface of the field in row strips which are laterally spaced apart from one another by a lateral distance equal to the desired width of middle strips, and lifting and turning the comminuted soil laterally toward the center line of the strip and away from the edges of the strip to produce an elevated row of comminuted soil between unplowed field strips. The unplowed field strips define middle strips for receiving water between the elevated rows of comminuted soil. This method for tilling soil requires only a single field operation to prepare the seedbed and to plant the seed. The usual successive plowing, discing and harrowing operations are not required.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIG. 8 is a plan view which illustrates the principal components of the agricultural implement shown in FIG. 1 which are arranged for tilling soil to produce elevated seedbeds for dry land farming;

FIG. 9 is a section view of the soil taken along the lines IX—IX of FIG. 8;

FIG. 10 is a view similar to FIG. 9 which illustrates the structure of the elevated seedbed rows taken along the line X—X of FIG. 8;

FIG. 11 is a view similar to FIG. 8 which illustrates the arrangement of the principal components of the agricultural implement for strip farming or for irrigation;

FIG. 12 is a sectional view taken along the lines XII—XII of FIG. 11 which illustrates structure of the soil prior to tilling;

FIG. 13 is a sectional view taken along the lines XIII—XIII of FIG. 11 which illustrates the structure of the elevated seedbeds and hardpan middles produced by the method and apparatus of the invention;

FIG. 21 is a right rear view of the agricultural implement of FIG. 1 shown in combination with a deflector shield;

FIG. 22 is a side elevation view of the agricultural implement shown in FIG. 21;

FIG. 23 is a rear elevation view of the agricultural implement shown in FIG. 21; and, FIG. 24 is an isometric view of the deflector shield shown in FIG. 21.

DETAILED DESCRIPTION

Figure 1:
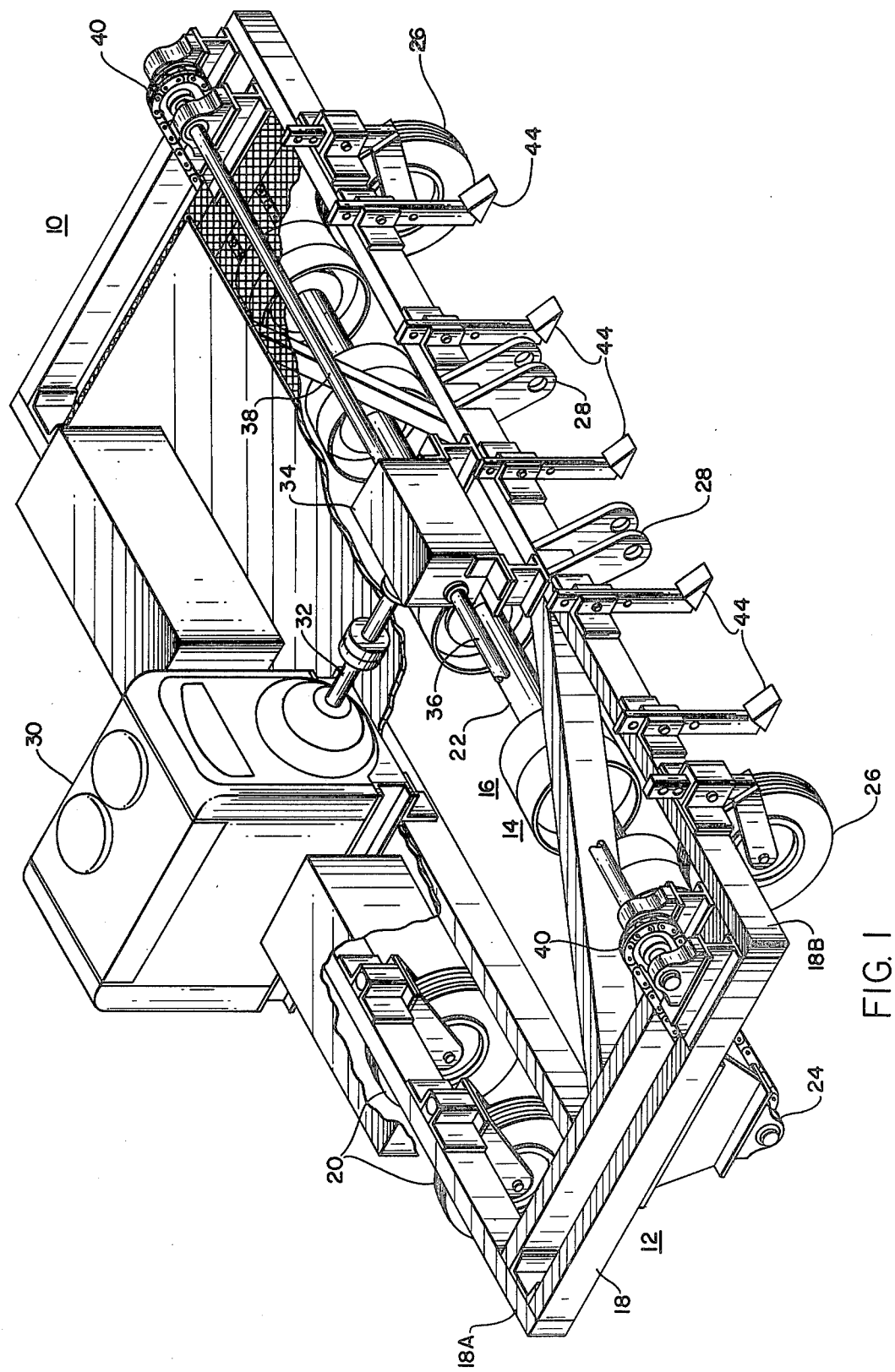
FIG. 1 is an isometric view of an agricultural implement constructed according to the teachings of the present invention.

Referring now to FIG. 1 of the drawing, an agricultural implement 10 constructed according to the teachings of the present invention is illustrated in an isometric view. The agricultural implement 10 comprises generally a carriage assembly 12 and a plurality of plowing tools 14, 16 mounted for rotation on the carriage assembly. The carriage assembly 12 includes a suspension frame 18 having a rear edge member 18A to which a plurality of supporting wheels 20 are attached permitting the carriage assembly 12 to traverse the surface of the soil to be plowed. The supporting wheels 20 are preferably journalled for swivel movement. The plowing tools 14, 16 are secured for concurrent rotation with a tool shaft 22 which is journalled for rotation in a bearing housing 24 carried by the suspension frame 18. The lateral position of each supporting wheel 20 is preferably adjustable to permit the supporting wheels to run along the center line of the furrows formed by the pairs of plowing tools 14, 16. Along the forward edge 18B of the suspension frame 18 are a pair of gage wheels 26 which can be vertically adjusted to vary the working depth of the plowing tools 14, 16. Also secured to the leading edge 18B of the suspension frame 18 are a pair of hitches 28 for coupling to the lower draft lengths 29 of a three point hitch of a towing vehicle such as the tractor 42 shown in FIG. 2.

According to a preferred embodiment, the tool shaft 22 and plowing tools 14, 16 are driven by an internal combustion engine 30 which is rigidly secured to the carriage assembly 12. The output of the internal combustion engine 30 is mechanically coupled through a drive shaft 32 and a gear 34 for applying a rotary driving force to the tool shaft 22 and plowing tools 14, 16. The gear 34 mechanically interconnects the drive shaft 32 to a pair of power transmission shafts 36, 38 which impart a rotary force to a drive chain assembly 40. The gear 34 permits the plowing tools 14, 16 to be rotated in like direction with the supporting wheels 20 and at a speed of rotation which is greater than the rotational speed of the supporting wheels. A relatively greater speed of rotation for the plowing tools 14, 16 is required in order to ensure that the soil is adequately comminuted or pulverized by the plowing tools. The internal combustion engine 30 is preferably a six cylinder, two cycle diesel engine having a power rating of 232 horsepower.

Figure 2:
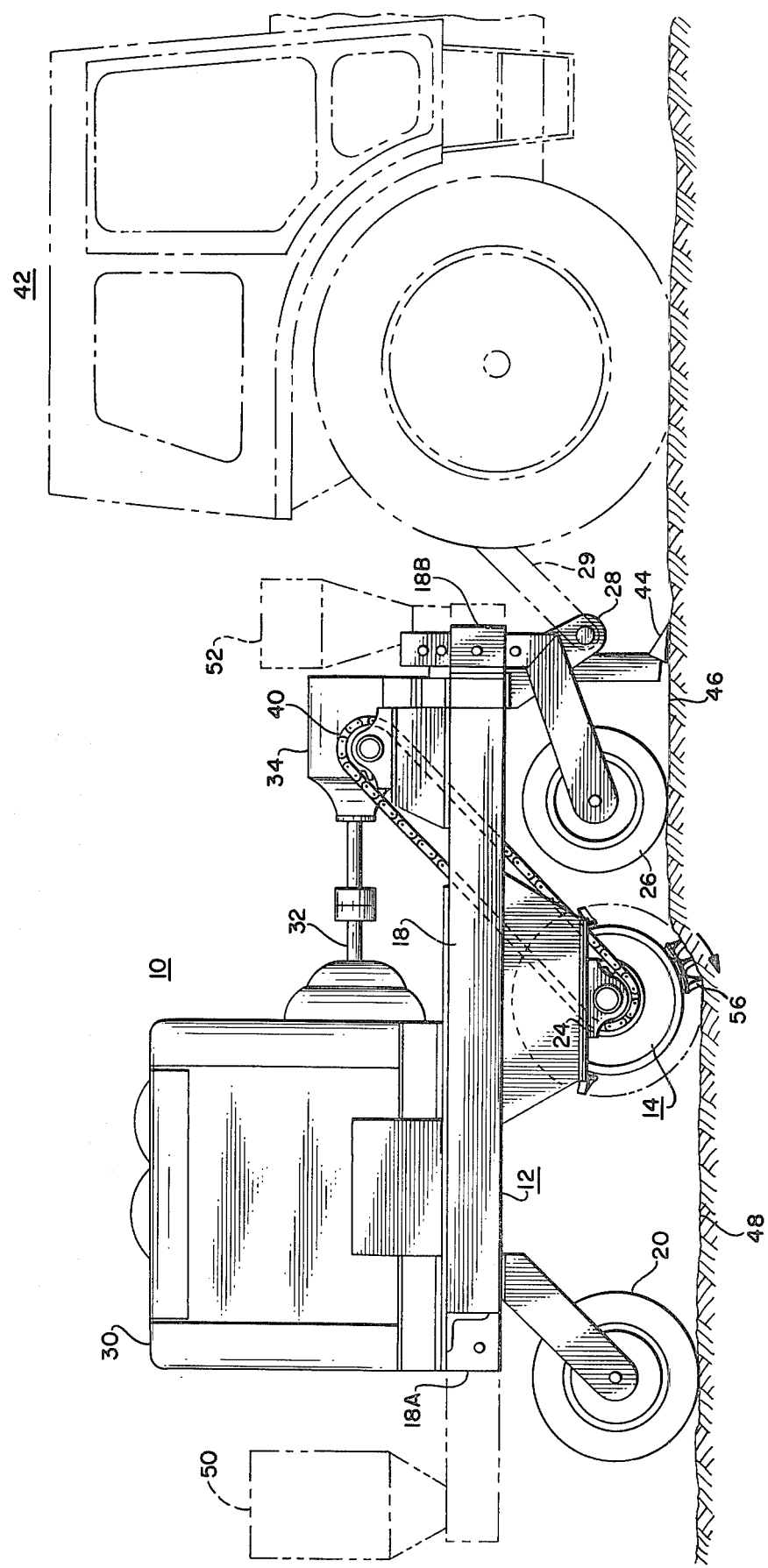
FIG. 2 is a side elevation view of the agricultural implement of FIG. 1 shown in combination with a tractor and auxiliary cultivating equipment.

Referring now to FIGS. 1 and 2, the agricultural implement 10 is shown mechanically coupled to a tractor 42. Because of the thrust developed by the plowing tools when driven by the internal combustion engine 30, very little tilling power will be required from the tractor 42. In some situations, the soil may be relatively soft so that the self-powered implement 10 exerts a pushing force against the tractor 42 and the tractor is used only for steering. In this situation, it may be desirable to mount an array of retarding plows 44 along the forward edge of the suspension frame 18 to engage the soil and offset the thrust developed by the plowing tools 14, 16. The retarding plows 44 are preferably vertically adjustable to vary their depth of engagement.

Referring now to FIG. 2, the gage wheels 26 are shown in engagement with the initial ground level 46 and the plowing tools 14, 16 and the supporting wheels 20 are disposed at a lower lever 48 which corresponds with the effective working depth of the plowing tools. This construction allows the gage wheels 26 to be set at any required height so as to run on the unplowed ground directly at the front of the plowing tools and thereby uniformly gage the effective working depth of the plowing tools, and accommodate the unevenness of the ground which influences the extent of penetration or working depth of the plowing tools.

It will be appreciated by those skilled in the art that the plowing tools may be driven by coupling the gear 34 to a power takeoff of the towing vehicle, in which case the internal combustion engine 30 would not be required. In this configuration it is important that the towing vehicle or tractor 42 have a hydrostatic drive so that its forward speed may be regulated continuously from zero while maintaining a constant rpm drive on the power takeoff. This permits the plowing tools 14, 16 to be rotated at a constant speed while varying the forward speed of the tractor.

The agricultural implement 10 may be adapted for "one pass" cultivation by equipping it with a planter 50 and a distributor 52 as shown in FIG. 2 of the drawing. The distributor 52 is mounted on the forward edge 18B of the suspension frame 18 directly in front and in alignment with the plowing tools 14, 16 so that a chemical cultivating agent such as fertilizer or herbicide can be applied to the unplowed surface 46 of the soil that it may be thoroughly mixed with the soil as it is comminuted by the plowing tools. The planter 50 is secured to the rear edge of the suspension frame 18 and in alignment with the center line of the seedbeds formed by the plowing tools 14, 16.

Figure 4:
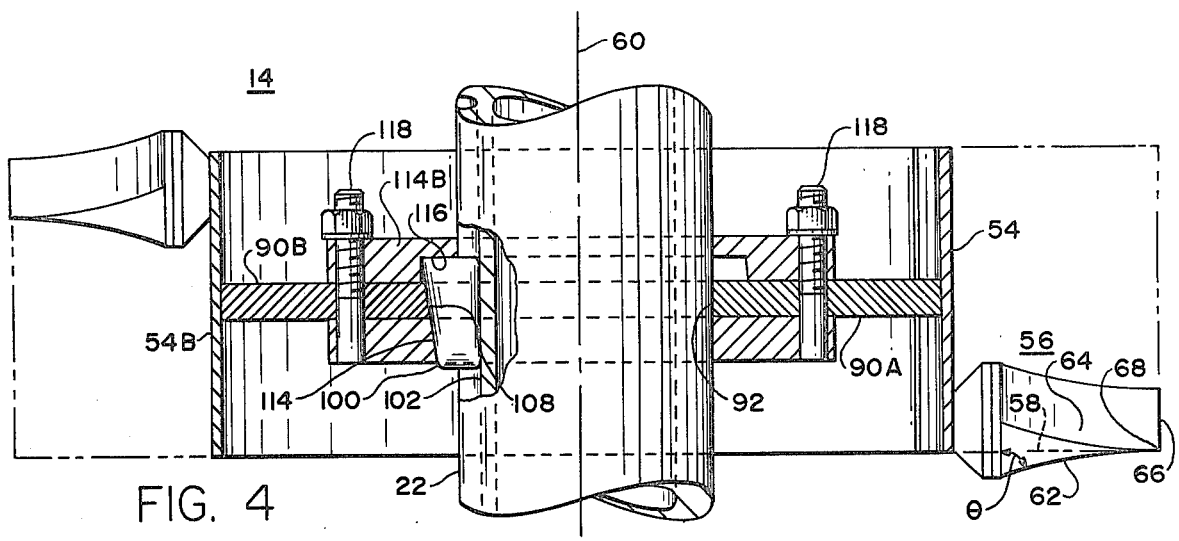
FIG. 4 is a sectional view taken along the line IV—IV of FIG. 3.
Figure 3:
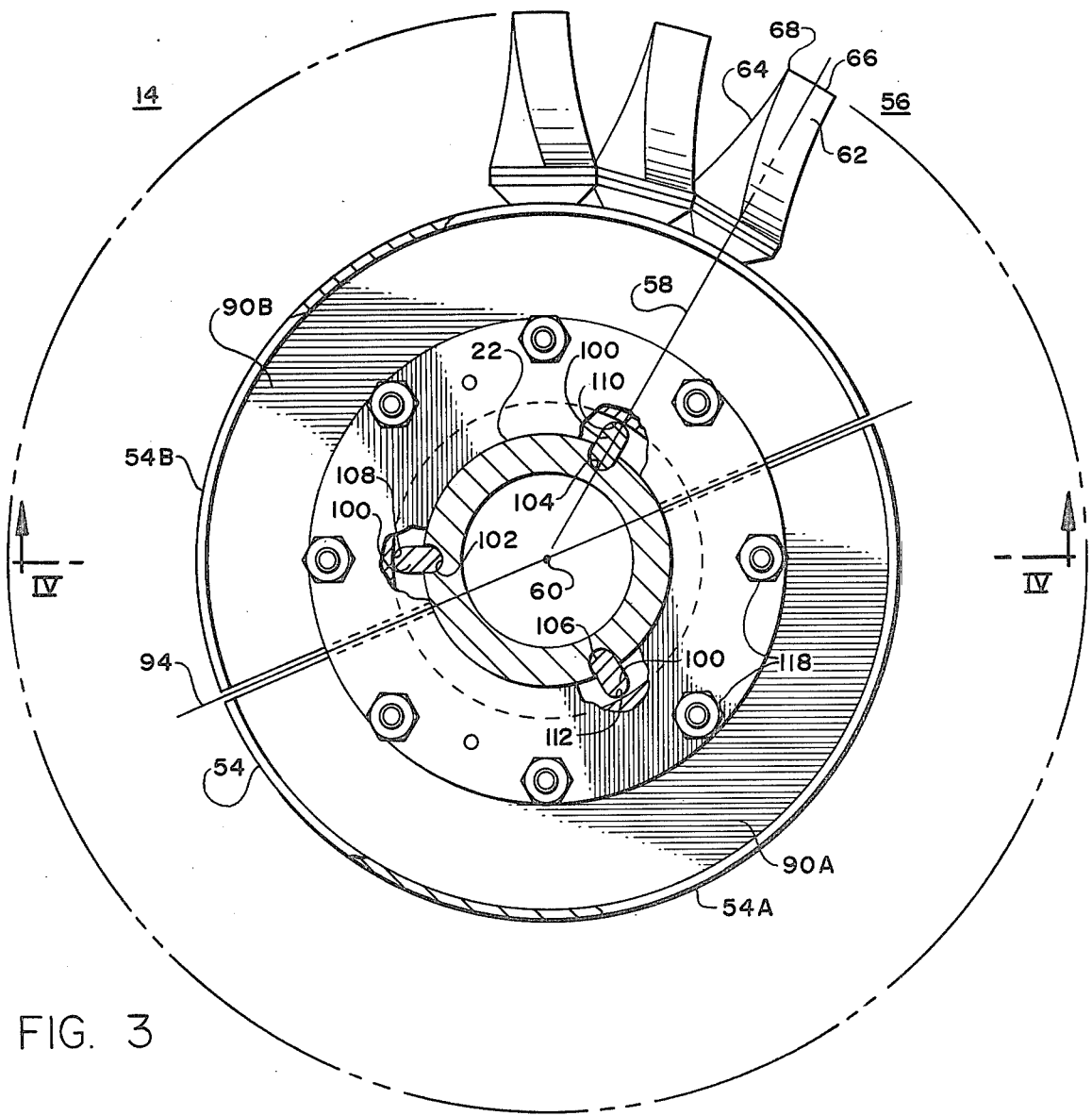
FIG. 3 is a side elevation view, partly in section, of a plowing tool constructed according to the teachings of the present invention.
Figure 5:
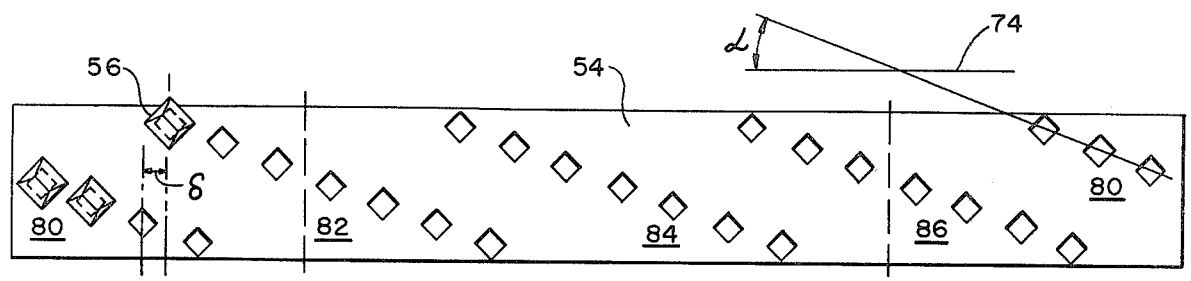
FIG. 5 is a developed two dimensional view of the rim of the plowing tool of FIG. 3 which illustrates the orientation and placement of soil digging teeth.

Referring now to FIGS. 3, 4 and 5, the construction of a typical plowing tool is illustrated. The plowing tool 14 comprises generally a cylindrical rim 54 and an array of soil digging teeth 56 secured to the outer periphery of the rim and projecting radially with respect thereto. The radial axis 58 of the tooth is disposed perpendicular to the axis 60 of rotation of the rim which is coincident with the longitudinal axis of the tool shaft 22.

Each tooth 56 is characterized by first and second planar faces 62, 64 which are obliquely inclined at an angle theta ($\theta$) with respect to the radial axis 58 of the tooth (FIG. 4). At least one of the faces must be inclined away from the direction of rotation in order to prevent clogging of soil along the face of the tooth. The incline of the planar face 62 is represented by the angle theta ($\theta$) as shown in FIG. 4 and is sloping away from the direction of rotation of the rim and teeth, assuming a clockwise rotation of the plowing tool 14. This incline to the face of the tooth 56 will prevent the clogging of grass, roots, and soil along the face of the tooth in a self cleaning action since the comminuted material will be urged outwardly along the inclined face 62 thus providing a self cleaning assembly. It is not necessary that both faces be inclined unless the plowing tool will be rotated in both clockwise and counterclockwise directions.

The inclined faces 62, 64 of the tooth 56 converge at the distal end of the tooth to define a cutting edge 66. The cutting edge 66 as shown in FIGS. 3 and 4 is preferably linear so that a three sided soil engaging point 68 is defined. According to an important feature of the invention, the teeth are canted at an oblique angle with respect to the direction of travel so that the soil is displaced laterally with respect to the direction of travel. In this arrangement, each tooth initially penetrates the soil on its soil penetrating point 68 instead of uniformly along its cutting edge 66. The important feature ensures that the soil is lifted and displaced laterally with respect to the line of travel of the tooth and also prevents compaction of the soil as it is penetrated by the teeth. When the soil is first penetrated by the penetrating point 68, the tip loading, that is the ratio of the weight of the machine versus the surface area of contact is extremely high and provides the ability of the teeth to break rocks or hardpan without damage to the teeth.

Figure 6:
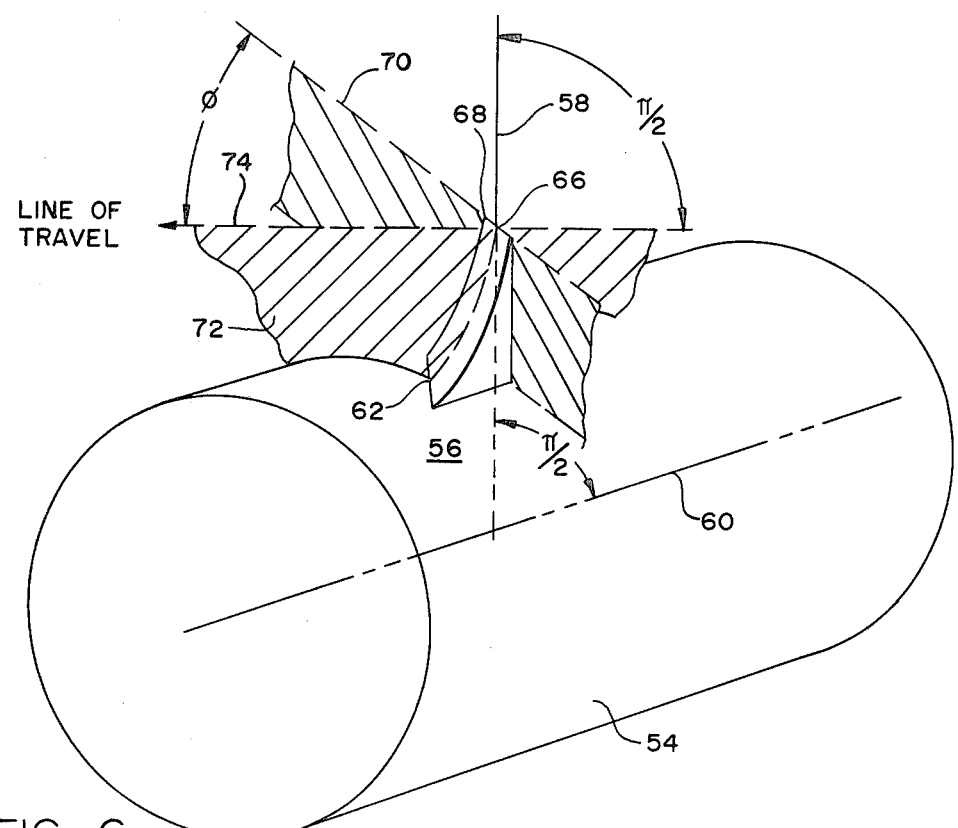
FIG. 6 is an isometric view which illustrates the canting arrangement of the teeth of the plowing tool shown in FIG. 3.

This arrangement is shown more clearly in FIG. 6 wherein the plane 70 containing the cutting edge 66 and radial axis 58 of the tooth defines an oblique angle phi ($\phi$) with the plane 72 which contains the line of travel 74 of the rim and the radial axis 58 of the tooth. The plane is perpendicular to the axis 60 of rotation of the rim 54. In this arrangement, the cutting edge 66 of the tooth defines an oblique cutting angle which is preferably equal to 45° with respect to the line of travel 74 of the rim as it is transported by the carriage assembly 12. In operation, the soil penetrating point 68 of the tooth 56 enters the soil and the soil is lifted vertically and displaced laterally with respect to the line of travel of the tooth as the tooth completes its circular path through the soil. The soil is aerated as it is lifted and dropped.

By displacing the comminuted soil laterally, compacting is avoided and therefore horsepower is conserved. The comminuted soil is ejected off of the inclined faces of the teeth at high velocity which tends to further pulverize it whether it be wet or dry. This virtually eliminates clods even in extremely dry conditions. Since the teeth are canted, that is are working at an angle, the comminuted soil is pushed continuously and is slipped off of the teeth. In the conventional teeth arrangements, in which the cutting edges are in alignment with the axis of rotation, the material must climb up the teeth which can cause clogging. Furthermore, the moisture content does not limit the operation of the teeth. The soil will be continuously broken down while it is being displaced laterally without clogging. Furthermore, since the teeth initially enter on the soil penetrating point 68, the teeth are self sharpening instead of being blunted by the compacting action characteristic of conventional tooth alignment arrangements.

Figure 7:
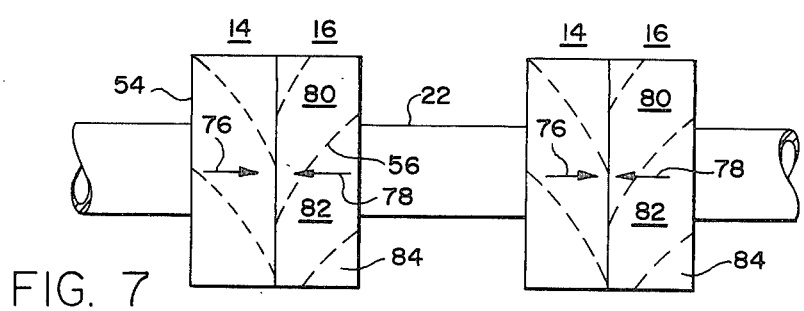
FIG. 7 is an elevation view which illustrates lateral spacing of adjacent pairs of plowing tools.

The teeth 56 are rigidly secured to the outer periphery of the rim 54 in a plurality of spiral rows 80, 82, 84 and 86, as shown in FIGS. 5 and 7. The rows 80-86 are preferably equally spaced in parallel with respect to one another and the teeth 56 in each row are disposed in a plane which defines an oblique angle alpha ($\alpha$) with respect to the line of travel 74 of the rim and carriage assembly. The optimum value of the oblique angle alpha is a function of the number of spiral rows and the oblique angle phi ($\phi$) defined by the cutting edge of each tooth. For an array of four spiral rows and a cutting angle phi equal to 45°, the preferred magnitude of alpha is 20°.

The number of teeth 56 in each of the spiral rows is preferably the same and corresponding teeth of adjacent rows are preferably located at the same axial distance as measured from the edge of the rim 54. In this arrangement one tooth from each of the spiral rows cuts along a common path which corresponds to an axial increment of the rim surface. The sum of the axial projections of the cutting edges in each spiral row should be substantially equal to or greater than the axial width of the rim to ensure that each increment of soil will be penetrated and comminuted without leaving a strip of soil undisturbed.

Pulsation and vibration are reduced by arranging the cutting edge of each tooth at the oblique cutting angle phi ($\phi$) so that each tooth will enter the soil on its penetrating point which will offer minimum resistance to the forward rolling movement of the rim. The pulsation and vibration is further minimized by spacing the teeth of adjacent pair of rows circumferentially with respect to one another, by a distance delta ($\delta$) as shown in FIG. 5, so that the initial engagement of each tooth with the soil occurs successively and not simultaneously in relation to the initial engagement of teeth disposed in adjacent rows. Although only one tooth of an array of rows of teeth is initially penetrating the soil at any point in time, several teeth of each row are in contact with the soil at any given time. This arrangement provides that the vibration and pulsation is minimized and there is a more or less steady pull or resistance as the plowing tool enters and is withdrawn from the soil.

Side drift is eliminated by the arrangement of the pairs of plowing tools 14, 16 into complementary pairs as shown in FIG. 7. In that arrangement, the cutting angle phi ($\phi$) of the teeth in the laterally adjacent plowing tools 14, 16 are equal to each other but are oppositely directed as measured with respect to the center line of travel of the plowing tools, as indicated by the arrows 76, 78. When the cutting angles of the teeth in the laterally adjacent pairs of cutting tools 14, 16 are oppositely directed toward each other, the teeth cooperate to displace soil laterally toward the center line of travel of the adjacent pair of plowing tools to form an elevated row of comminuted soil. A furrow is formed having a center line in common with the center line of the laterally adjacent pair of plowing tools when the cutting angles of the teeth in the laterally adjacent pairs are oppositely directed away from each other to displace the soil laterally away from the center line of travel of the adjacent pair of plowing tools as the rims 54 rotate. Side drift is also eliminated by reversing the canting angle of each tool section as discussed below.

The plowing tools 14, 16 are preferably adjustable laterally with respect to the line of travel of the carriage assembly so that rows of different spacings can be formed to accommodate the requirements of different crops or the preferences of individual farmers. Furthermore, it is desirable that the plowing tools be easily removable from the tool shaft 22 so that the cutting angle $\phi$ of each tool can be reversed if desired. Such a structural arrangement is illustrated in FIGS. 3, 4, and 7 of the drawing. Each plowing tool 14, 16 is of a unique split construction which enables it to be removed from the tool shaft 22 without the necessity of removing the tool shaft 22 from the suspension frame 18. Referring to FIG. 3, the rim 54 of the plowing tool 14 is radially split into substantially equal half-cylindrical section 54A and 54B. The cylindrical half sections 54A, 54B are secured to the tool shaft 22 by means of radially projecting web sections 90A, 90B respectively. Each web includes an edge portion 92 which is disposed in engagement with the outer periphery of the tool shaft 92. The cylindrical half sections are separable along a radial line 94 which extends from opposite peripheral edges of the rim and passes through the axis 60 of rotation of the rim.

Means are provided for removably coupling the cylindrical rim half sections to the tool shaft 22 and for locking the sections in a selected position to prevent their rotation relative to the shaft and to prevent axial displacement of the sections away from a selected position, for example as shown in FIG. 7. This function is carried out by means of a plurality of tapered keys 100. The keys are disposed in registration with aligned openings formed by the alignment of axially extending slots 102, 104, and 106 formed along equally spaced locations around the periphery of the tool shaft 22 and with corresponding openings 108, 110 and 112 formed in the web 90 at corresponding equally spaced locations around the web. Each of the keys 100 includes a tapered edge 114 as can best be seen in FIG. 4 of the drawing. The keys 100 are secured in a compressive union with the tool shaft 22 and web 90 by fastening means which preferably comprises a pair of plate 114A and 114B disposed on the opposite sides of the web 90. The plate 114A includes tapered openings corresponding with the openings 108, 110 and 112 to permit the keys 100 to project completely therethrough. However, the corresponding tapered openings in the plate 114B disposed on the opposite side of the web 90 extend only partially through the plate so that a compressive force can be imposed on the head 116 of each key 100 as a threaded fastener 118 is tightened. This arrangement permits the plowing tools 14, 16 to be easily assembled or disassembled along any axial position of the tool shafts 22. The position of each plowing tool can be adjusted simply by loosening the threaded fastener 118 and sliding the plowing tool along the shaft to the desired position and then retightening the threaded fasteners. If it is desired to remove the plowing tool from the drum for any reason, for example to replace a tooth or to reverse the plowing tool by 180° so that the teeth turn the soil in a laterally opposite direction, the cylindrical rim half sections 54A and 54B can be completely removed from the tool shaft 22 without removing this tool shaft 22 from the carriage assembly. This is carried out by removing the threaded fasteners 118 and plates 114A and 114B and separating the cylindrical rims along the radial line 94.

An important application of the plowing tool apparatus described above is in farming row crops and has particular application for use in sequentially producing two rows crops over the same field as illustrated in FIGS. 8, 9 and 10 of the drawing. The row crop may be for example corn, which is typically planted in elevated seedbed rows 120 having furrows 122 formed intermediate the elevated rows. After the corn has matured, it is harvested and the stalks are shredded with the residue 124 being collected in the furrows. According to a preferred method which employs the apparatus of the present invention, the soil and stubble 126 from adjacent pairs of rows 120 are comminuted and laterally displaced into the common furrow 122 lying intermediate the adjacent rows thereby forming a new seedbed row disposed intermediate hardpan middles or furrows 130. The new seedbed rows 128 are elevated with respect to the furrows 130 and are characterized by composite homogeneous mixture of comminuted soil and plant residue from the adjacent pairs of rows 120 and have the same center lines as the previous furrows 122. Similarly, the new furrows are hardpan middles 130 which have the same center lines as the previous rows 120.

The advantage of this method is that the organic residue 124 collected in the previous furrows 122 is covered over by the comminuted soil in the rows 128 which promotes the composting of the organic material, improves the fertility of the soil, and improves the soil's ability to retain moisture. A new crop can then be planted in the elevated seedbed rows 128. The planting step and the application of fertilizer or herbicide may be carried out at the same time as discussed above, thus approaching "one pass" farming.

The hardpan furrows or middles 130 are particularly useful for transporting irrigation water with the result that the water moves across the field faster as compared to the flow rate across a conventional unstructued middle. In this arrangement, less water is required since the water is absorbed very rapidly throughout the comminuted soil, and seeps very slowly through the hardpan middles. Maximum saturation of the new seedbed rows 128 is accomplished, even though the water is moved faster by the use of the hardpan middles. Consequently, more acres can be watered in each day from the same well capacity. Furthermore, once the hardpans and seedbeds are constructed, the same hardpan middles and seedbed rows may be used year after year, without needing to reconstruct the rows and middles.

In dry land farming, it is important to conserve the available rainfall in order to produce a profitable yield from the crops. An important variation of dry land farming is strip farming in which alternate strips of a field are plowed leaving intervening strips with existing vegetation to stop soil erosion due to wind. This method of farming is illustrated in FIGS. 11, 12 and 13 of the drawing. As seen in FIG. 11, the cutting edges of the teeth mounted on the plowing tools 14, 16 of each laterally adjacent pair are angled facing each other as indicated by the arrows 132, 134. With this arrangement, the plowing tools 14, 16 produce elevated seedbeds of comminuted soil on alternate sides of unplowed strips of soil 138. The unplowed strips 138 are polished and rolled by the rotating tool shaft 22 as the agricultural implement traverses the soil.

When the field is located in a region which typically receives adequate rainfall to produce the row crop, the row strips 136 are formed in perpendicular relation with respect to the fall line or natural slope of the field so that the water will run off of the hardpan middles 138. Rainfall collected on the hardpan middles 138 will quickly run off onto the next lower row 136 of comminuted soil. When the field is located in a region in which irrigation water is provided to produce the row crop, the row strips 136 are formed in parallel relation to the fall line or natural slope of the field so that water at one end of the field will run down the rows to the other end of the field. In this case, the hardpan middles 138 will permit the irrigation water to be transported over the surface with minimum absorption through the hardpan surface. In this arrangement, it is anticipated that irrigation water will be distributed through every middle 138 which will supply an adequate amount of water for both rows surrounding each third middle, thus substantially reducing the total amount of water discharged onto the field to saturate the elevated rows.

Figure 14:
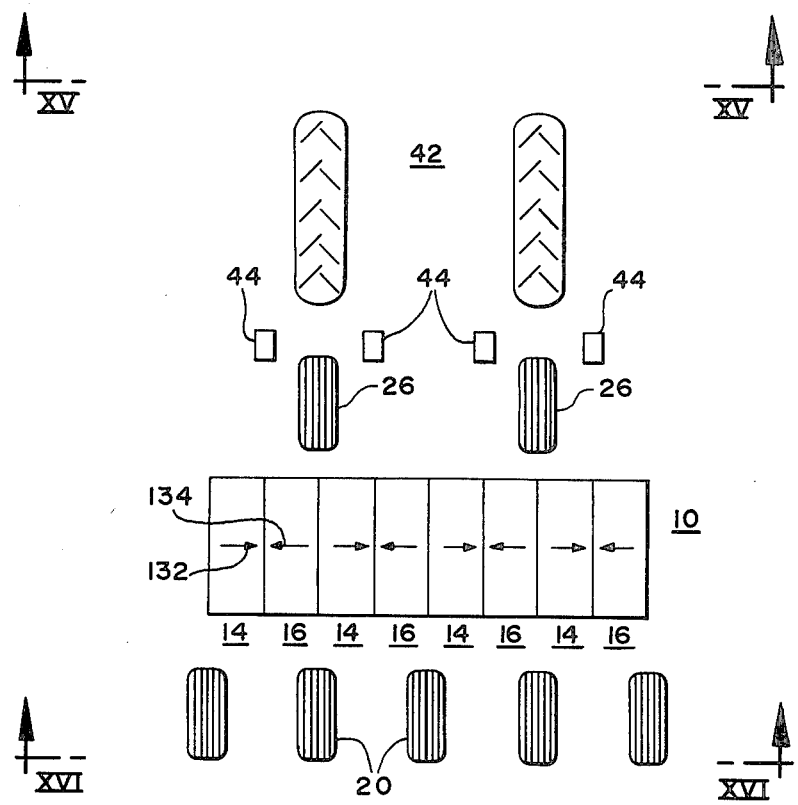
FIG. 14 is a view similar to FIG. 8 which illustrates the arrangement of the plowing tools of the invention for constructing new rows over a cleared field.
Figure 15:
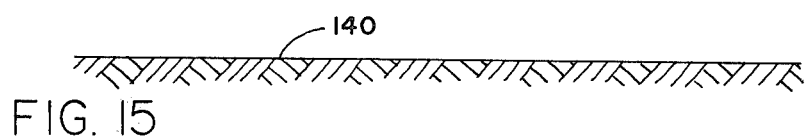
FIG. 15 is a sectional view taken along the lines XV—XV of FIG. 14 which illustrates the cleared field prior to plowing.
Figure 16:
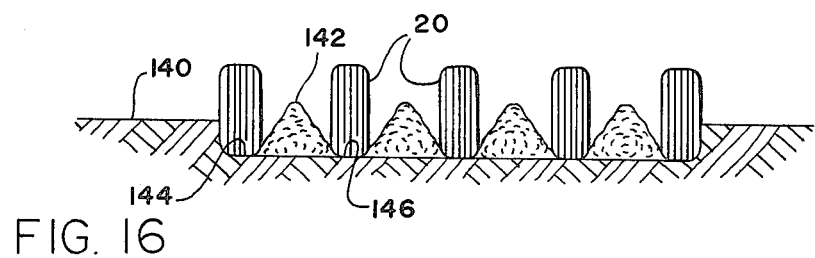
FIG. 16 illustrates a sectional view of the rows formed in the field of FIG. 14 taken along the lines XVI—XVI.
Figure 17:
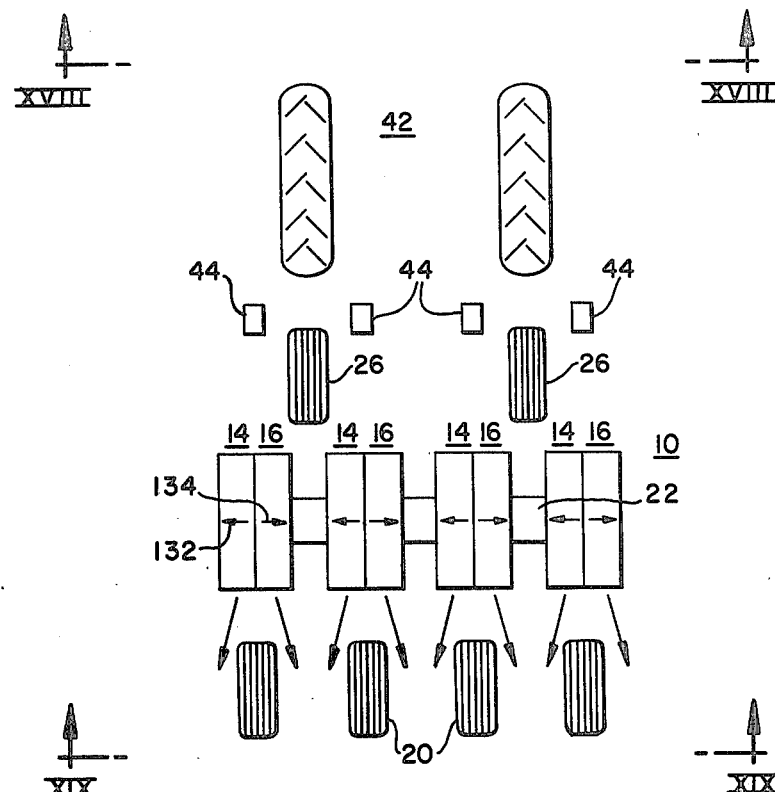
FIG. 17 is a plan view which illustrates the principal components of the agricultural implement shown in FIG. 1 which are arranged for tilling soil to produce elevated seed bed rows.
Figure 18:
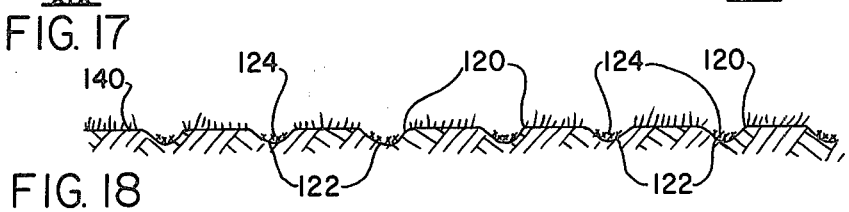
FIG. 18 is a section view of the soil taken along the lines XIX—XIX of FIG. 17.
Figure 19:
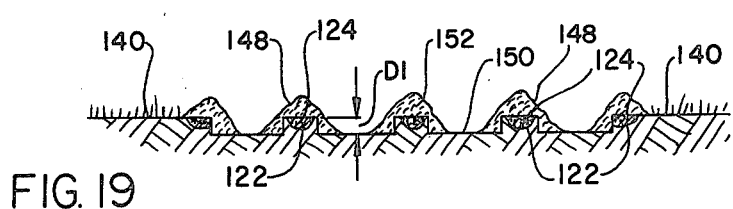
FIG. 19 is a section view of the soil taken along the lines XIX—XIX of FIG. 17.
Figure 20:
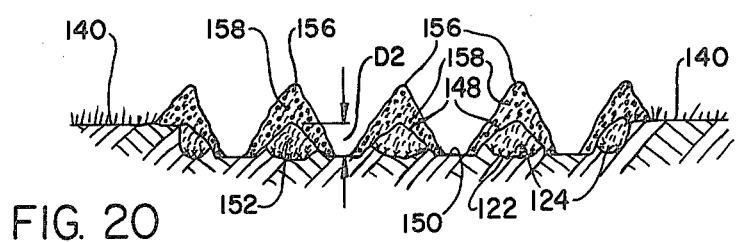
FIG. 20 is a section view similar to FIG. 19.

Alternate plowed furrows and elevated seedbed rows can be formed over a previously unplowed field as illustrated in FIGS. 14, 15 and 16 of the drawing. Alternate plowed rows and furrows are produced by mounting additional pairs of plowing tools to the tool shaft 22 as shown in FIG. 14 and orienting the cutting edges of the teeth to displace soil laterally toward the center line of each pair of plowing tools. The unplowed soil 140 is then comminuted to the desired depth of the furrows in adjoining longitudinal row strips which correspond with the width of the laterally adjacent plowing tool pairs 14, 16. The plowing tools comminute the soil and lift it and turn it in a single operation thereby defining an elevated row 142 disposed between parallel furrows 144 and 146. The center line of the elevated row 142 corresponds with the center line of the laterally adjacent pair of plowing tools 14, 16 which produced it. The furrows of adjacent row strips are formed along a common lateral boundary line which corresponds with the boundary between adjacent pairs of plowing tools. The supporting wheels 20 are laterally spaced along the rear edge of the suspension frame 18 in alignment with the furrows 146 thereby providing compaction of the loose soil which falls into the furrows.

A variation of the method disclosed in the preceding paragraph is illustrated in FIGS. 17, 18, 19 and 20. This procedure is particularly well suited for turning under a previously plowed field 140 having rows 120 and furrows 122 in which crop residue 124 is collected. It may also be utilized to good advantage on a previously unplowed field, for example, in the early spring prior to planting when it is desired to turn under a winter crop in preparation for spring planting. According to that procedure, the plowing tools 14, 16 are arranged with the cutting edges of their teeth 56 oppositely canted with respect to each other to displace soil laterally away from the center line of each plowing tool pair as illustrated by the arrows 132, 134 in FIG. 17. Adjacent pairs of the plowing tools 14, 16 are spaced from one another along the shaft 22 to produce elevated seedbed rows 148 and furrows 150. The comminuted soil 152 in the seedbed rows 148 are displaced from the furrows 150 from a first predetermined depth D1 and into the old furrows 122 thereby covering the residue 124 during a first pass of the tractor 42 and implement 10. Thereafter, during a second pass the soil in the furrow 150 is comminuted to a depth D2. The comminuted soil displaced during the second pass forms a second layer 156 on top of the first layer along each row 148. During the second pass, a chemical cultivating agent 158 such as fertilizer or herbicide may be discharged onto the surface of the seedbed row 148 immediately prior to the formation of the second layer 156, or it may be mixed with the soil during the comminution and displacement of the soil as the second layer 156 is formed. By this method the fertilizer and herbicide is distributed throughout the top layer 156 where it may be utilized more effectively and efficiently. Also, the combination of comminuted soil 152 with the organic material 124 provides a compost mixture which improves the fertility of the soil and increases the ability of the soil to retain moisture.

In the operation of the agricultural implement 10 during the formation of the rows and furrows, a certain portion of the comminuted soil is projected rearwardly and upwardly off of the teeth 56. Although most of the comminuted soil is displaced laterally and upwardly to form the elevated seedbed rows, a certain amount of finely comminuted soil and particulate matter will cling to the teeth 56 and be projected upwardly and rearwardly over the elevated seedbed rows as the plowing tools rotate. Since it is generally desirable to retain as much of the comminuted soil as possible for the seedbed rows and to minimize the amount of fugitive dust and particulate material produced by the plowing operation, a soil deflector shield 160 is attached to the carriage assembly 12 in the manner illustrated in FIGS. 21, 22, 23 and 24. The deflector shield 160 is secured to the carriage assembly 12 in closely spaced, radially bounding relation with respect to the plowing tools 12, 14 in a partially encircling relationship so that finely comminuted soil and particulate material ejected off of the teeth 56 will be deflected back onto the teeth or onto the elevated seedbed rows. The deflector shield 160 includes a hollow, substantially semi-cylindrical body member 162 on which laterally spaced, circumferentially projecting shield plates 164 are secured. The end portions of each shield plate 164 underlie a portion of the adjacent elevated seedbed rows as the implement 10 traverses the field. The shield plates 164 are preferably adjustably secured to the cylindrical body member 162 in order to adjust their working depth. In FIG. 24, adjustment is provided by set screws 166 so that the deflector plates can be adjusted vertically or angularly through channels defined by the ribs 168, 170.

The deflector plates 164 are laterally spaced with respect to each other to define intermediate openings 172 which permit the passage of the deflector shield over the elevated seedbed row without disturbing the comminuted soil. The deflector plates 164 are aligned with the common center line of travel of an adjacent pair of furrow producing plows 14, 16 and each intermediate space 172 is aligned with the common center line of travel of an adjacent pair of row producing plows. In certain applications, it may be desirable to partially cover the opening 172 by means of a flexible flap 174 which is secured to the cylindrical body member 162 at the top of each of the openings 172. The flap 174 may be constructed of a material such as rubber or canvas having sufficient resiliency and weight to ride over the top of the elevated rows without significantly changing or disturbing the comminuted soil in the row. Accordingly, as the rotating plowing tools cut, cultivate, comminute and fluff the soil, and as this soil is projected rearwardly at a high velocity, the deflector plates 164 and the flaps 174 deflect that portion of the projected soil which would otherwise be lost while operating without the deflector shield assembly 160. The deflector plates 164 and flaps 174 also provide seedbed shaping as the deflector plates 164 clear the furrow and the flaps 174 slightly flatten the top of the seedbed row.

The rotary plowing tools 14, 16 in combination with the tool shaft 22 simultaneously carries out the soil working operations of penetration, comminution, lifting and laterally displacing the soil, aerating the soil, and elevating the soil in row strips which when performed by conventional apparatus and methods has required multiple passes of different implements. It is apparent that it may be used to good advantage in a variety of row crop farming methods including irrigation farming, dry land farming and strip farming. In addition, it has utility in soil working for truck farming, and for use on small hand operated tractor garden cultivators. Its foremost advantage in these farming methods is "one pass" tilling which it affords. Furthermore, planting and dispensing of herbicides and fertilizer can be incorporated during the one pass tilling step. Because the soil is thoroughly comminuted, broken down and aerated, it produces a superior seedbed for the germination of seeds which has superior water retention characteristics. Additionally, because the soil whether it be wet or dry does not adhere to the teeth of the plow, it may be operated over an extended plowing season, for example when the conditions are either too wet or too dry for plowing with conventional agricultural implements. Furthermore, because the teeth laterally displace the soil rather than compacting the soil, the horsepower requirements for driving the plowing tools of the present invention is substantially less than for conventional rotary plows. Several rows of the teeth are in contact with the soil at any given point in time and the teeth enter the soil along their soil penetrating points, so that the pulsation or vibration caused by the engagement of the teeth of the soil is very low as compared with conventional plows and so that a steady pull or resistance to the forward motion of the plows is produced as the carriage assembly traverses the soil. The teeth of adjacent plowing tools are always oppositely canted so that the load is balanced. This eliminates side drift which characterizes conventional rotary plows. When used in a double cropping operation, where time is of the essence, the seedbeds may be rapidly prepared or reconstructed and the new crop planted in one pass. In the strip farming operations on ranch land, the rotary plow of the present invention permits a fraction of the surface to be utilized for planting hybrid grasses, for example, while permitting cattle to continue to graze on the unplanted strips so that all of the land is fully utilized during the time the hybrid grasses are growing to maturity.

Because of its relatively low power requirements and stability, the plowing tool of the present invention also has utility in various commercial applications such as in strip mining of coal and the loading of the coal including the stripping of over burden and comminuting the coal from the seams. It also has utility for various excavation applications.

Although the preferred embodiments of the invention have been described in combination with an agricultural implement, it should be understood that it can be used in various other applications. It should furthermore be understood that various changes, substitutions, and alterations can be made therein without departing from the spirit and scope of the invention as defined by the appended claims.

What is claimed is:

1. An agricultural implement for plowing soil comprising:
    a carriage assembly having supporting wheels for traversing the surface of the soil to be plowed; and
    a plurality of plowing tools mounted for rotation on the carriage assembly, each plowing tool having a cylindrical rim and an array of soil digging teeth secured to the rim and projecting radially with respect to the surface thereof, each tooth of the array being rigidly secured to the rim with its radial axis disposed perpendicular to the axis of rotation of the rim and being characterized by first and second planar faces at least one of which being obliquely inclined with respect to the radial axis of the tooth and sloping away from the direction of rotation of the rim, the planar faces converging at the distal end of the tooth to define a cutting edge, each tooth of the array on each rim being oriented in such a manner that the plane containing the cutting edge and the radial axis of the tooth defines an oblique cutting angle with respect to the plane containing the radial axis of the tooth and the line of travel of the carriage assembly.

2. The agricultural implement as defined in claim 1 wherein the oblique cutting angle is substantially equal to forty-five degrees.

3. An agricultural implement as defined in claim 1 wherein the plowing tools are adjustable laterally with respect to the line of travel of the carriage assembly.

4. An agricultural implement as defined in claim 1 including:
    a shaft journalled for rotation in the carriage assembly about a substantially horizontal axis positioned above the surface of the soil and extending parallel to the rotational axis of the supporting wheels; and,
    means adjustably securing the plowing tools on the shaft so that the plowing tools can be selectively fixed in different axial positions along the shaft.

5. The agricultural implement as defined in claim 4 wherein each of the plowing tools comprise at least two sections separable along a radial line extending from opposite peripheral edges of the rim so that the plowing tools can be removed from the shaft without removing the shaft from the carriage assembly.

6. The agricultural implement as defined in claim 5 wherein the rim of each plowing tool is divided into two substantially equal cylindrical half sections, the adjustable securing means including:
    first and second web members rigidly secured to the interior edge of the cylindrical half sections, respectively, the webs projecting radially toward the axis of the rim sections, each web having an interior edge portion for engaging the shaft; and,
    means removably coupling the rim sections to the shaft and locking the rim sections in a selected position to prevent rotation of the rim sections relative to the shaft and to prevent axial displacement of the rim sections away from the selected position.

7. The agricultural implement as defined in claim 1, the array of radially projecting teeth of each plowing tool being disposed in a plurality of spiral rows around the periphery of the rim, the rows being equally spaced in parallel with respect to one another and the teeth within each row being equally spaced one from another, the teeth in each spiral row being disposed in a plane which defines an oblique angle with respect to the line of travel of the carriage assembly.

8. The agricultural implement as defined in claim 7, the oblique angle defined by the plane containing the teeth of a spiral row being substantially equal to twenty degrees.

9. The agricultural implement as defined in claim 7, the sum of the axial projections of the cutting edges in each spiral row being substantially equal to or greater than the axial width of the rim.

10. The agricultural implement as defined in claim 7, the number of teeth in each of the spiral rows being the same and corresponding teeth of adjacent rows being located at the same axial distance as measured from an edge of the rim, whereby one tooth from each spiral row cuts along a common path which corresponds to an axial increment of the rim surface.

11. The agricultural implement as defined in claim 7 wherein the arc spanned by one row of an adjacent pair of rows overlaps the arc spanned by the adjacent row, there being at least one tooth from each row of the adjacent pair of rows disposed on the rim surface bounded by the common arc, the teeth of the adjacent pair of rows being circumferentially spaced from one another so that initial engagement of each tooth with the soil occurs successively and not simultaneously in relation to the initial engagement of adjacent teeth of the array.

12. The agricultural implement as defined in claim 1, the plowing tools being disposed along a common axis which extends laterally with respect to the line of travel of the carriage assembly, the cutting angle being substantially the same for each tooth of a selected one of the plowing tools, the cutting angle of the teeth in a laterally adjacent plowing tool being equal thereto but oppositely directed as measured with respect to the line of travel of the carriage assembly.

13. The agricultural implement as defined in claim 12, the plowing tools being secured together along the common axis in laterally adjacent pairs and the pairs being axially spaced one from another along the common axis.

14. The agricultural implement as defined in claim 13, the cutting angles of the teeth in the laterally adjacent pairs being oppositely directed toward each other whereby the teeth of an adjacent pair of tools cooperate to displace soil laterally toward the center line of travel of the adjacent pair of tools as the plowing tools rotate.

15. The agricultural implement as defined in claim 13, the cutting angles of the teeth in the laterally adjacent pairs of plowing tools being oppositely directed away from each other whereby the teeth of an adjacent pair of tools cooperate to displace soil laterally away from the centerline of travel of the adjacent pair of tools as the plowing tools rotate.

16. The agricultural implement as defined in claim 1 including means secured to the carriage assembly in front of the plowing tools for distributing herbicide or fertilizer onto the surface of the soil immediately in front of selected ones of the plowing tools whereby the herbicide or fertilizer is thoroughly mixed with the soil as it is turned and laterally displaced by the rotation of the plowing tools.

17. The agricultural implement as defined in claim 1 including means secured to the carriage assembly behind the plowing tools for planting seeds in the soil which has been turned and laterally displaced by the rotation of the plowing tools.

18. The agricultural implement as defined in claim 1, the carriage assembly including:
a generally rectangular suspension frame pivotally secured to the supporting wheels, the frame extending laterally with respect to the direction of travel of the implement and having a hitch assembly for attachment to a towing vehicle;
gage wheels adjustably secured to the frame forward of the plowing tools to raise or lower the leading edge of the frame with respect to soil whereby the effective working depth of the plowing tools is regulated; and,
transmission means supported by the frame operably connected to the plowing tools to cause them to revolve about a substantially horizontal axis in response to a rotary driving force.

19. The agricultural implement as defined in claim 18 wherein the towing vehicle is a tractor having a power take off, the transmission means including a power input shaft which is connectable to the power take off and operable to transmit a rotary driving force from the power take off to drive the plowing tools.

20. The agricultural implement as defined in claim 19 including gearing means mechanically interconnecting the power input shaft and the plowing tools operable to rotate the plowing tools in like direction with the supporting wheels, and at a speed of rotation which is greater than the rotational speed of the supporting wheels.

21. The agricultural implement as defined in claim 18 including:
an internal combustion engine supported by the suspension frame and mechanically coupled to apply a rotary driving force to the transmission means.

22. The agricultural implement as defined in claim 21, including:
an array of retarding plows secured to the frame at laterally spaced positions forward of the plowing tools, the array of plows extending laterally with respect to the line of travel of the carriage assembly, the plows being adjustably secured to the frame to control the effective working depth of the plowing tools.

23. A soil working implement for use in forming a raised soil bed comprising a frame and first and second rotatable soil engaging members secured together in side-by-side relation on the frame, each soil engaging member including an array of radially projecting, soil digging teeth secured thereto for moving soil laterally and upwardly relative to the line of travel of the implement, each tooth having an inclined forward face slanting away from the direction of rotation of the soil engaging member and a rear face converging with the forward face to form a cutting edge which is canted at an oblique angle with respect to the line of travel of the implement, the cutting edges of the teeth of the first and second soil engaging members being oppositely canted with respect to each other for lifting and laterally displacing soil toward or away from the common centerline of travel of the soil engaging members.

24. A plowing tool comprising a cylindrical rim and an array of radially projecting teeth secured to the periphery of the rim, each tooth being characterized by first and second planar faces, at least one of the faces being obliquely inclined with respect to the radial axis of the tooth, the planar faces converging at the distal end of the tooth to define a cutting edge, the plane containing the cutting edge and the radial axis of the tooth defining an oblique angle with respect to the longitudinal axis of the rim.

25. The plowing tool as defined in claim 24 wherein the oblique angle defined by the plane containing the cutting edge and the radial axis of the tooth is substantially equal to forty-five degrees.

26. The plowing tool as defined in claim 24, the array of radially projecting teeth being disposed in a plurality of spiral rows around the periphery of the rim, the rows being equally spaced in parallel with respect to one another and the teeth within each row being equally spaced one from another, the teeth in each spiral row being disposed in a plane which defines an oblique angle with respect to the longitudinal axis of the rim.

27. The plowing tool as defined in claim 26 wherein the oblique angle defined by the plane containing the teeth of a spiral row is substantially equal to twenty degrees.

28. The plowing tool as defined in claim 26, the sum of the axial projections of the cutting edges in each spiral row being substantially equal to or greater than the axial width of the rim.

29. The plowing tool as defined in claim 26, the number of teeth in each of the spiral rows being the same and corresponding teeth of adjacent rows being located at the same axial distance as measured from an edge of the rim, whereby one tooth from each spiral row cuts along a common path which corresponds to an axial increment of the rim surface.

30. The plowing tool as defined in claim 26 wherein the arc spanned by one row of an adjacent pair of rows overlaps the arc spanned by the adjacent row, there being at least one tooth from each row of the adjacent pair of rows disposed on the rim surface bounded by the common arc, the teeth of the adjacent pair of rows being circumferentially spaced one from another whereby initial engagement of each tooth with the soil occurs successively and not simultaneously in relation to the initial engagement of teeth in adjacent rows of the array.

31. An agricultural implement for plowing soil comprising:
a carriage assembly having supporting wheels for traversing the surface of the soil to be plowed;
a shaft journalled for rotation in the carriage assembly about a substantially horizontal axis positioned above the surface of the soil and extending parallel to the rotational axis of the supporting wheels;

a plurality of rotatable soil working plows secured to the shaft, each plow including a cylindrical rim and an array of soil digging teeth secured thereto, each tooth having an inclined face slanting away from the direction of rotation of the tooth and converging to form a cutting edge which is canted at an oblique angle with respect to the line of travel of the implement;

the teeth of each plow in an adjacent pair of plows being oppositely canted with respect to each other for lifting and laterally displacing soil toward or away from the common centerline of travel of the adjacent pair for producing an elevated row or a furrow, respectively; and, a deflector shield secured to the carriage assembly in radially spaced, bounding relation with respect to the plows, the deflector shield including a hollow, substantially semi-cylindrical body member disposed immediately behind the soil working plows, the body member having laterally spaced, circumferentially projecting shield plates which are aligned with the common centerline of travel of an adjacent pair of furrow producing plows, and each space intermediate the shield plates being aligned with the common centerline of travel of an adjacent pair of row producing plows.

32. The agricultural implement as defined in claim 31 wherein each circumferentially extending shield plate is adjustably secured to the cylindrical body member to permit the effective working depth of each shield plate to be changed relative to the depth of a furrow formed by the corresponding adjacent pair of plows.

33. The agricultural implement as defined in claim 31, further including a flexible flap secured to the cylindrical body member and overlying the intermediate space separating an adjacent pair of circumferentially extending shield plates.

34. A deflector shield for use with an agricultural implement of the type having a plurality of rotatable plow teeth arranged in laterally spaced groups, the spacing corresponding to rows and furrows, the deflection shield comprising:

a hollow, substantially semi-cylindrical body member having circumferentially projecting shield plates which are laterally spaced from one another in substantial alignment with a predetermined furrow spacing arrangement, each space intermediate the shield plates being in substantial alignment with a predetermined row spacing arrangement.

35. The deflector shield as defined in claim 34 wherein each shield plate is adjustably secured to the cylindrical body member to permit the effective working depth of each shield plate to be adjusted.

36. The deflector shield as defined in claim 35, further including a flexible flap secured to the cylindrical body member and overlying the intermediate space separating an adjacent pair of shield plates.

37. A method of cultivating soil to produce a row crop comprising the steps:
(a) comminuting the soil to a first predetermined depth in furrows which are laterally spaced apart from one another by a distance corresponding to the desired width of elevated seedbed rows;
(b) lifting and turning the comminuted soil in each furrow away from the centerline of the furrow and onto the unplowed seedbed strip lying intermediate adjacent furrows to form elevated seedbeds of comminuted soil;
(c) comminuting the soil in the laterally spaced furrows produced by step (a) to a second predetermined depth;
(d) lifting and turning the comminuted soil produced in each furrow by step (c) away from the centerline of the furrow and onto the adjacent elevated seedbed rows of comminuted soil produced by step (b); and,
(e) distributing a chemical cultivating agent onto the surface of the comminuted soil of the elevated seedbed rows prior to or during the performance of step (d).

38. A method of cultivating the soil of a field from which a row crop planted in elevated seedbed rows having furrows formed intermediate the elevated rows has been previously harvested, the method comprising the steps of:
(a) shredding the plant growth remaining after the row crop is harvested and displacing at least some of the shredded residue into the furrows;
(b) comminuting the soil and any remaining plant residue in the elevated seedbed rows; and,
(c) displacing the comminuted soil and shredded plant residue from adjacent pairs of rows into the common furrow lying intermediate the adjacent rows thereby forming new elevated seedbed rows characterized by a composite mixture of comminuted soil and shredded plant residue from adjacent pairs of rows overlying a layer of shredded plant residue, the new elevated seedbed rows having the same centerlines as the furrows of the harvested crop, and thereby providing new furrows on either side of the new elevated seedbed rows having the same centerline as the elevated seedbed rows of the harvested crop.

39. A method for sequentially producing two row crops comprising the steps:
(a) planting the first crop in elevated seedbed rows having furrows formed intermediate the elevated rows;
(b) harvesting the first row crop;
(c) shredding the plant growth remaining after the first crop is harvested;
(d) comminuting the soil in the elevated seedbed rows;
(e) displacing the comminuted soil and shredded plant residue from adjacent pairs of rows laterally into the common furrow lying intermediate the adjacent rows thereby forming elevated seedbed rows characterized by a composite mixture of comminuted soil and plant residue from adjacent pairs of rows and having the same centerlines as the furrows of the first crop, and thereby providing furrows on either side of the elevated seedbed rows formed for the second crop having the same centerline as the elevated seedbed rows of the first crop; and,
(f) planting the second row crop in the elevated seedbed rows formed by the performance of step (e).

40. The method as defined in claim 39 wherein the comminuting step and the soil displacing step are performed simultaneously by the operation of the same agricultural implement.

41. The method as defined in claim 39 including the step of rolling the furrows as the elevated seedbeds are formed.

42. The method as defined in claim 39 including the step of distributing a chemical cultivating agent onto the surface of the existing seedbed row prior to performing step (d).

43. A method for constructing alternate seedbed rows and furrows over a field by tilling the field with an agricultural implement of the type characterized by
   a carriage assembly having supporting wheels for traversing the surface of the soil to be plowed;
   a shaft mounted on the carriage assembly for rotation about a substantially horizontal axis relative to the surface of the soil and extending parallel to the rotational axis of the supporting wheels; and
   a pair of plowing tools mounted in lateral relation to each other on said shaft, each plowing tool having a rim and an array of soil digging teeth secured to the rim and each tooth having a soil displacing face sloping away from the direction of rotation of the rim and an opposite face, the soil displacing face converging at the distal end of the tooth with the opposite face to define a cutting edge which is canted with respect to the line of travel of the carriage assembly;
   said method comprising the steps:
   (a) traversing the field with said agricultural implement while comminuting the soil with the soil digging teeth to the desired depth of the furrows in a longitudinal row strip;
   (b) lifting and turning the comminuted soil with the soil displacing faces of the teeth laterally toward the centerline of the row strip and away from the edges of the row strip thereby defining an elevated row of comminuted soil disposed between parallel furrows; and
   (c) repeating steps (a) and (b) over adjacent strips of the field, the furrows of adjacent row strips being formed along a common lateral boundary line.

44. A method of tilling soil for farming a row crop in an unplowed field comprising the steps:
   (a) comminuting the soil to a predetermined depth below the unplowed surface of the field in row strips which are laterally spaced apart from one another by a lateral distance equal to the desired width of middle strips; and,
   (b) lifting and turning the comminuted soil laterally toward the centerline of the strip and away from the edges of the strip thereby defining an elevated row of comminuted soil between unplowed field strips, the unplowed field strips defining middle strips for receiving water between the elevated rows, the middle strips being elevated with respect to the comminuted depth of the row strips.

45. The method as defined in claim 44 wherein the field is located in a region which typically receives adequate rainfall to produce the row crop, the row strips being produced by step (a) in perpendicular relation to the fall line or natural slope of the field.

46. The method as defined in claim 44 wherein the field is located in a region in which irrigation water is provided to produce the row crop, the row strips being produced by step (a) in parallel relation to the fall line or natural slope of the field.

47. The method as defined in claim 44 including the step of rolling and polishing the unplowed surfaces of the furrows.

48. The method as defined in claim 47 wherein the comminuting step, the lifting and turning step, and the rolling and polishing step are performed simultaneously by operation of the same agricultural implement.

49. A method of cultivating the soil of a field from which a row crop planted in elevated seedbed rows having furrows formed intermediate the elevated rows has been previously harvested, the method comprising the steps:
   (a) shredding the plant growth remaining after the row crop is harvested and displacing at least some of the shredded residue into the furrows;
   (b) comminuting the soil and any remaining plant residue in the elevated seedbed rows to a first predetermined depth;
   (c) lifting and turning the comminuted soil and shredded plant residue produced by step (b) from adjacent pairs of rows into the common furrow lying intermediate the adjacent rows thereby forming new elevated seedbed rows characterized by a composite mixture of comminuted soil and shredded plant residue from adjacent pairs of rows overlying a layer of shredded plant residue, the new elevated seedbed rows having the same centerlines as the furrows of the harvested crop, and thereby providing new furrows on either side of the new elevated seedbed rows having the same centerline as the elevated seedbed rows of the harvested crop;
   (d) comminuting the soil in the new furrows produced by step (c) to a second predetermined depth;
   (e) lifting and turning the comminuted soil produced by step (d) away from the centerline of the furrow and onto the adjacent elevated seedbed rows of comminuted soil produced by step (c); and,
   (f) distributing a chemical cultivating agent into the layer of comminuted soil produced by step (e) as the comminuted soil is displaced onto the elevated seedbed rows produced by step (c).

50. A plowing tool comprising a rim and an array of radially projecting teeth secured to the periphery of the rim, each tooth being characterized by a soil displacing face which is inclined with respect to its radial axis, the soil displacing front face converging at the distal end of the tooth with a rear face to define a cutting edge, the plane containing the cutting edge and the radial axis of each tooth defining an oblique angle with respect to the longitudinal axis of the rim, and the soil displacing face of each tooth sloping generally in the same circumferential direction relative to the periphery of the rim.

51. A tool for working soil comprising a rim and an array of radially projecting teeth secured to the periphery of the rim, each tooth having a soil displacing front face converging at the distal end of the tooth with a rear face to define a cutting edge, the plane containing the cutting edge and the radial axis of the tooth defining an oblique angle with respect to the longitudinal axis of the rim, and the soil displacing face of each tooth sloping generally in the same circumferential direction relative to the periphery of the rim, said teeth being axially and circumferentially spaced relative to each other whereby initial engagement of each tooth with the soil responsive to rotation of said rim occurs successively and not simultaneously with respect to the initial engagement of other teeth of the array.

52. An agricultural implement for plowing soil comprising:
   a carriage assembly having supporting wheels for traversing the surface of the soil to be plowed; and a plurality of plowing tools mounted for rotation on the carriage assembly, each plowing tool having a rim and an array of soil digging teeth secured to the rim and each tooth having a soil displacing front face sloping away from the direction of rotation of the rim, the soil displacing front face converging at the distal end of the tooth with a rear face to define a cutting edge which is canted with respect to the line of travel of the carriage assembly.

53. An agricultural implement for plowing soil comprising:
 a carriage assembly having supporting wheels for traversing the surface of the soil to be plowed;
 a shaft mounted on the carriage assembly for rotation about a substantially horizontal axis relative to the surface of the soil and extending parallel to the rotational axis of the supporting wheels;
 a pair of plowing tools mounted in lateral relation to each other on said shaft, each plowing tool having a rim and an array of soil digging teeth secured to the rim and each tooth having a soil displacing front face sloping away from the direction of rotation of the rim, the soil displacing face converging at the distal end of the tooth with a rear face to define a cutting edge which is canted with respect to the line of travel of the carriage assembly;
 said teeth in each array being axially and circumferentially spaced relative to each other whereby initial engagement of each tooth with the soil responsive to rotation of said shaft occurs successively and not simultaneously in relation to the initial engagement of other teeth of the array; and
 the cutting angle of the teeth in the laterally adjacent plowing tools being oppositely directed with respect to each other whereby the teeth of the laterally adjacent pair of plowing tools cooperate to comminute, lift and displace soil laterally either toward or away from the common center line of travel of the adjacent pair of tools for producing an elevated row or furrow, respectively.

54. The agricultural implement as defined in claim 53, the array of radially projecting teeth of each plowing tool being disposed in a plurality of spiral rows around the periphery of the rim, the rows being axially spaced in parallel with respect to one another and the teeth within each row being circumferentially spaced one from another, the teeth in each spiral row being disposed in a plane which defines an oblique angle with respect to the line of travel of the carriage assembly.

55. The agricultural implement as defined in claim 54, the oblique angle defined by the plane containing the teeth of a spiral row being substantially equal to twenty degrees.

56. The agricultural implement as defined in claim 54, the sum of the axial projections of the cutting edges in each spiral row being substantially equal to or greater than the axial width of the rim.

57. The agricultural implement as defined in claim 54, the number of teeth in each of the spiral rows being the same and corresponding teeth of adjacent rows being located at the same axial distance as measured from an edge of the rim, whereby one tooth from each spiral row cuts along a common path which corresponds to an axial increment of the rim surface.

58. The agricultural implement as defined in claim 54, wherein the arc spanned by one row of an adjacent pair of rows overlaps the arc spanned by the adjacent row, there being at least one tooth from each row of the adjacent pair of rows disposed on the rim surface bounded by the common arc, the teeth of the adjacent pair of rows being circumferentially spaced from one another so that initial engagement of each tooth with the soil occurs successively and not simultaneously in relation to the initial engagement of adjacent teeth of the array.

59. The agricultural implement as defined in claim 53, the plowing tools being disposed along a common axis which extends laterally with respect to the line of travel of the carriage assembly, the cutting angle being substantially the same for each tooth of a selected one of the plowing tools, the cutting angle of the teeth in a laterally adjacent plowing tool being oppositely directed as measured with respect to the line of travel of the carriage assembly.

60. The agricultural implement as defined claim 59, the plowing tools being secured together along the common axis in laterally adjacent pairs and the pairs being axially spaced one from another along the common axis.

61. The agricultural implement as defined in claim 60, the cutting angles of the teeth in the laterally adjacent pairs being oppositely directed toward each other whereby the teeth of an adjacent pair of tools cooperate to lift and displace soil laterally toward the center line of travel of the adjacent pair of tools as the plowing tools rotate.

62. The agricultural implement as defined in claim 60, the cutting angles of the teeth in the laterally adjacent pairs of plowing tools being oppositely directed away from each other whereby the teeth of an adjacent pair of tools cooperate to displace soil laterally away from the centerline of travel of the adjacent pair of tools as the plowing tools rotate.

63. A method for constructing alternate seedbed rows and furrows over a field comprising the steps:
 (a) comminuting the soil to the desired depth of the furrows in a longitudinal row strip;
 (b) lifting and turning the comminuted soil laterally toward the centerline of the row strip and away from the edges of the row strip thereby defining an elevated row of comminuted soil disposed between parallel furrows;
 (c) rolling the furrows as the elevated rows are formed; and,
 (d) repeating steps (a), (b) and (c) over adjacent strips of the field, the furrows of adjacent row strips being formed along a common lateral boundary line.

* * * * *

UNITED STATES PATENT AND TRADEMARK OFFICE
CERTIFICATE OF CORRECTION

PATENT NO. : 4,199,030

DATED : April 22, 1980

INVENTOR(S) : John H. Chance

It is certified that error appears in the above-identified patent and that said Letters Patent are hereby corrected as shown below:

| | |
|---|---|
| Column 6, line 10 | after "soil" insert --so--; |
| Column 7, line 10 | after "off" delete --of--; |
| Column 8, line 43 | "92" should be --22--; |
| Column 11, line 3 | after "winter" insert --cover--. |

Signed and Sealed this

Seventh Day of October 1980

[SEAL]

Attest:

SIDNEY A. DIAMOND

Attesting Officer     Commissioner of Patents and Trademarks